No. 638,790. Patented Dec. 12, 1899.
F. W. WUNDERLICH.
DRIVING MECHANISM.
(Application filed Apr. 29, 1899.)
(No Model.)

WITNESSES
Richard P. Elliott
H. M. Kehr

INVENTOR
Frank W. Wunderlich.
by his attorney,
James Hamilton

UNITED STATES PATENT OFFICE.

FRANK W. WUNDERLICH, OF ARLINGTON, MASSACHUSETTS.

DRIVING MECHANISM.

SPECIFICATION forming part of Letters Patent No. 638,790, dated December 12, 1899.

Application filed April 29, 1899. Serial No. 715,065. (No model.)

*To all whom it may concern:*

Be it known that I, FRANK W. WUNDERLICH, a citizen of the United States, residing at Arlington, in the county of Middlesex and State of Massachusetts, have invented a new and useful Improvement in Driving Mechanism, of which the following is a specification, reference being had to the accompanying drawings, in which—

Figure 1:
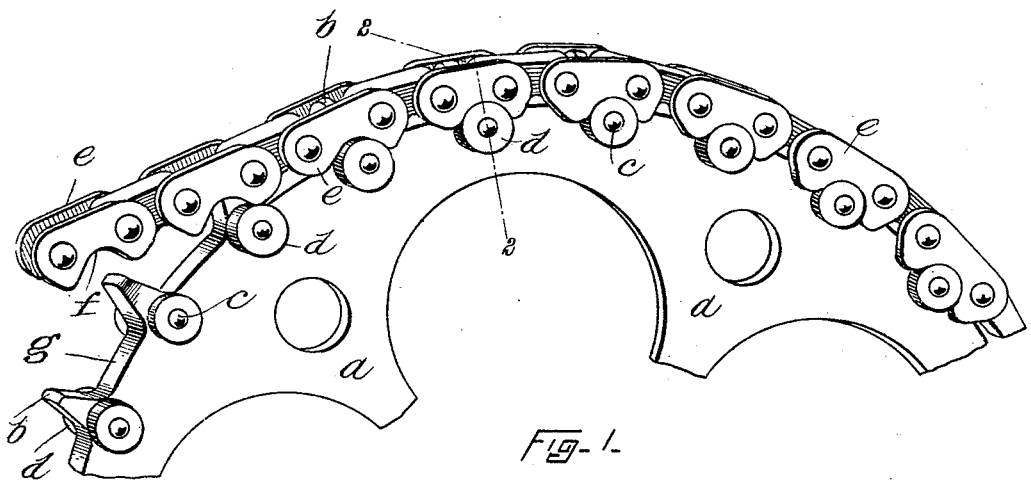
Figure 2:
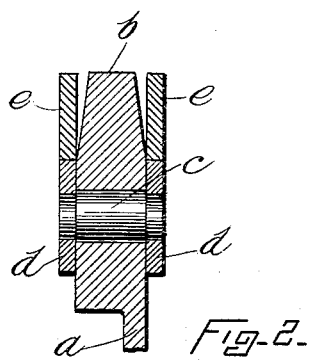

Figure 1 is a perspective view showing the driving-chain in engagement with the sprocket-wheel. Fig. 2 is a section on the line 2 2 of Fig. 1.

My invention relates to improvements in the driving mechanism described in United States Letters Patent No. 617,797, granted to me January 17, 1899; and the objects of my invention are to provide a more efficient means of keeping the chain in place, to reduce the number of rubbing surfaces, and thereby to reduce the friction, to reduce the number of parts, and to simplify and cheapen the construction.

In the drawings illustrating the principle of my invention and the best mode now known to me of applying that principle, $a$ is a sprocket-wheel provided with teeth $b$. Journaled in the outer portion of the wheel and near the base portion of each tooth $b$ is a shaft $c$, upon the ends of which are mounted rollers $d$. The convex surface or rim portion of the roller is smooth and not grooved. The side links $e$ of the chain are formed with a notch $f$, which adapts them to engage the rollers $d$, and the shafts $c$ are so placed that when the side links $e$ are in engagement with the rollers $d$ the chain is held out of contact with the peripheral or rim portion $g$ of the wheel. This construction avoids the friction which takes place between the rim portion of the wheel and the chain. Dirt and grit accumulating on the rim portion of the ordinary wheel increases its diameter, thereby causing a tightening of the chain and greatly increased pressure and friction between the wheel and chain.

The advantages of my present construction are, first, fewness of parts, thus cheapening and simplifying the construction; second, fewness of rubbing surfaces; third, reduction of friction due to structural features, the result so much sought after in driving mechanism for bicycles and motor-vehicles; fourth, practical efficiency, and, fifth, simplicity in construction and cheapness in manufacture.

What I claim is—

The combination of a chain, the side links of which are notched to engage and bear upon rollers; a wheel provided with teeth; a plurality of shafts mounted in said wheel; and a plurality of rollers mounted on said shafts, said rollers engaging in notches in the side links of said chain and holding said chain out of contact with the rim of said wheel; the teeth of the sprocket-wheel entering between the side links of the chain and preventing lateral displacement of said chain.

In testimony whereof I have affixed my signature in presence of two witnesses.

FRANK W. WUNDERLICH.

Witnesses:
JAMES HAMILTON,
SPENCER C. RICHARDSON.